(12) United States Patent
Thomson et al.

(10) Patent No.: US 11,146,076 B2
(45) Date of Patent: Oct. 12, 2021

(54) BATTERY MODULE WITH ACTIVE CELL BALANCING USING ENERGY STORAGE ELEMENT AND TWO TIERS OF SWITCHES

(71) Applicant: GM Global Technology Operations LLC, Detroit, MI (US)

(72) Inventors: Tamara R. Thomson, Hazel Park, MI (US); Fang Wang, Troy, MI (US); Tao Wang, Oakland Township, MI (US); Theodore T. Kim, Rochester Hills, MI (US); Larry T. Nitz, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 526 days.

(21) Appl. No.: 16/030,083

(22) Filed: Jul. 9, 2018

(65) Prior Publication Data

US 2020/0014219 A1     Jan. 9, 2020

(51) Int. Cl.
*H02J 7/00* (2006.01)
*H02J 7/34* (2006.01)
*B60L 58/22* (2019.01)

(52) U.S. Cl.
CPC .......... *H02J 7/0016* (2013.01); *H02J 7/0021* (2013.01); *B60L 58/22* (2019.02); *H02J 7/345* (2013.01)

(58) Field of Classification Search
CPC ..................................................... H02J 7/0016
See application file for complete search history.

(56) References Cited

U.S. PATENT DOCUMENTS

| 2014/0340022 | A1* | 11/2014 | Kang | H02J 7/0014 320/103 |
| 2015/0244190 | A1* | 8/2015 | Yamamoto | H02J 7/0014 320/126 |

* cited by examiner

*Primary Examiner* — Robert Grant
(74) *Attorney, Agent, or Firm* — Quinn IP Law

(57) ABSTRACT

A battery system includes a battery module, an active cell balancing circuit, and a battery controller. Each cell has diametrically-opposed positive and negative cell tabs. The circuit includes voltage sensors and, at each end of the battery module, first and second tiers of switches and an energy storage element. Each voltage sensor is located between a different pair of adjacent cells. The controller receives measured voltages from the sensors indicative of an electric potential between adjacent battery cells. Responsive to the measured voltages, the controller commands the first tier to selectively connect or disconnect designated pairs of cells to the corresponding second tier. The controller also commands the second tier to selectively connect or disconnect the designated cells to a corresponding energy storage element. This action shuttles energy between the designated pairs of battery cells to balance a state of charge.

13 Claims, 4 Drawing Sheets

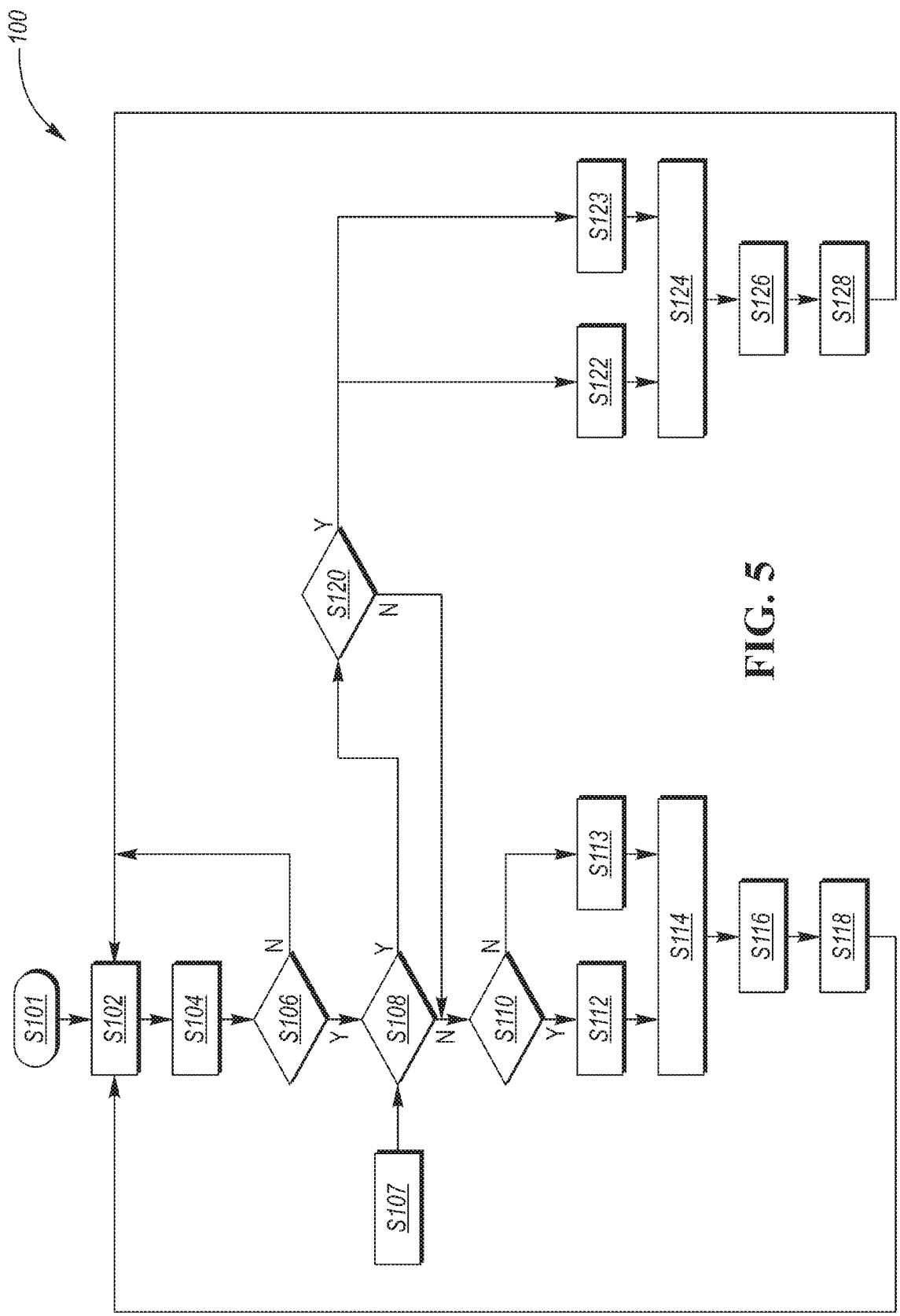

BATTERY MODULE WITH ACTIVE CELL BALANCING USING ENERGY STORAGE ELEMENT AND TWO TIERS OF SWITCHES

INTRODUCTION

Electrochemical batteries provide electrical energy to torque-generating electric machines and other electrical devices in a wide variety of electromechanical systems. A battery module includes multiple interconnected battery cells arranged in a stack. Within a given battery cell, a thin separator layer may be disposed between oppositely-charged electrode foils. The separator material, such as a polyethylene or polypropylene film, acts as an insulator to help prevent electrical short conditions. The electrode foils and the separator material are sealed within a foil pouch containing an electrolyte solution, with the electrolyte solution permitting a free transfer of electrons between the electrodes.

Battery cells using the above-noted foil pouch construction may have a symmetrical cell tab configuration in some embodiments. A symmetrical battery tab configuration is one in which positive and negative cell tabs of each battery cell protrude from opposite perimeter edges of the pouch. The cell tabs of multiple similarly-constructed battery cells are electrically interconnected in series or parallel via a conductive member or bus bar cap to construct a battery module having an application-specific voltage capacity.

A battery module may include a battery controller and one or more cell sense boards (CSBs) embodied as flex circuits or rigid printed circuit boards. A CSB may be used to read individual battery cell voltages, i.e., the total electric potential between cathode and anode, and other relevant battery data such as cell temperature. The CSB then reports the measured battery data to the battery controller as part of an overall battery control and power management strategy. In order to properly measure the individual cell voltages, therefore, existing battery management techniques may include extending electrical cables or wiring harnesses between the cell tabs of each of the battery cells.

SUMMARY

A battery system is disclosed herein having a battery module and a controller. The battery module includes a cell balancing circuit and multiple battery cells, with each battery cell having a symmetrical battery cell configuration of the type described generally above. The controller performs an active cell balancing method using the cell balancing circuit to shuttle energy in a controlled manner between designated pairs of the battery cells. The present approach is intended to eliminate the need for extended wires between cell tabs of the various battery cells when performing cell voltage measurement and balancing operations, as well as other battery management functions. Additionally, use of the disclosed cell balancing circuit may reduce energy losses relative to certain types of passive balancing operations.

The cell balancing circuit employs two tiers of active cell balancing mechanization. The term "tier" as used herein refers to positioning of switches relative to a stack or string of interconnected battery cells. A first tier of switches, e.g., single-pole switches, connects designated pairs of the battery cells to the second tier of switches. The second tier of switches, which may be double-pole switches, connects or disconnects the designated pairs of battery cells to an energy storage element, e.g., a capacitor or an inductor. Voltage measurements are taken between every two adjacent battery cells within the stack, with overall control of the switches ultimately balancing a state of charge of the battery cells.

A battery system is disclosed herein that includes, in an example embodiment, a battery module, an active cell balancing circuit, and a battery controller. The battery module has a first end, a second end, and a string of battery cells. Each respective battery cell has diametrically-opposed positive and negative cell tabs, i.e., is symmetrical. The circuit includes voltage sensors and, at each of the first and second ends of the battery module, first and second tiers of switches and an energy storage element. Each voltage sensor is respectively located between a different pair of adjacent battery cells of the string.

The controller receives measured voltages from the voltage sensors indicative of an electric potential between each pair of the adjacent battery cells. Responsive to the measured voltages, the controller commands the first tier of switches at the first or second ends to selectively connect or disconnect designated pairs of the battery cells to the second tier of switches at a corresponding one of the first or second ends. The controller also commands the second tier of switches to selectively connect or disconnect the designated pairs of battery cells to a corresponding one of the energy storage elements to thereby shuttle energy between the designated pairs of battery cells and thereby balance a state of charge of the string.

The energy storage elements may be capacitors or inductors in two possible embodiments.

The battery controller may calculate a battery cell voltage for each respective battery cell of the string using the measured voltages, compare the calculated battery cell voltage for each of the battery cells to a calibrated threshold cell voltage, and command the first and second tiers of switches of the first and second ends to open or close responsive to one or more of the calculated battery cell voltages exceeding the calibrated threshold cell voltage.

The battery controller may command different switches of the first and/or second tiers of switches to open or close responsive to one of the battery cells in the string having a highest cell voltage in the string being adjacent to one of the battery cells in the string having a lowest cell voltage in the string.

The switches of the first tier of switches may be single-pole switches and the switches of the second tier of switches may be double-pole switches.

A method for actively balancing a state of charge of a string of battery cells in a battery module is also disclosed. The method may include respectively positioning an active cell balancing circuit at first and second ends of the battery module, the active cell balancing circuit including energy storage elements and a plurality of voltage sensors. Each voltage sensor is respectively located between a different pair of adjacent battery cells of the string. The circuit further includes first and second tiers of switches located at each of the first and second ends of the battery module.

The method includes receiving measured voltages from the voltage sensors via a battery controller. The measured voltages are indicative of an electric potential between each of the different pairs of adjacent battery cells. Responsive to the measured voltages, the method includes using the battery controller to command the first tier of switches of the first or second end to close or open and thereby respectively connect or disconnect designated pairs of the battery cells to a corresponding one of the second tier of switches. The method also includes commanding the second tier of switches to selectively connect or disconnect the designated pairs of battery cells to one of the energy storage elements, via the battery controller, such that energy is shuttled between the designated pairs of battery cells and balance a state of charge of the string of battery cells.

In another embodiment, an active cell balancing circuit is provided for use with the above battery module. The circuit includes first and second energy storage elements positioned at the first and second ends, respectively, voltage sensors respectively located between a different pair of adjacent battery cells of the string, and first and second tiers of switches located at the first end of the battery module and configured as set forth above.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

BRIEF DESCRIPTION OF THE DRAWINGS

FIG. 5 is a flowchart describing an embodiment for implementing the present disclosure using the active cell balancing circuit shown in FIG. 4.

Figure 1:
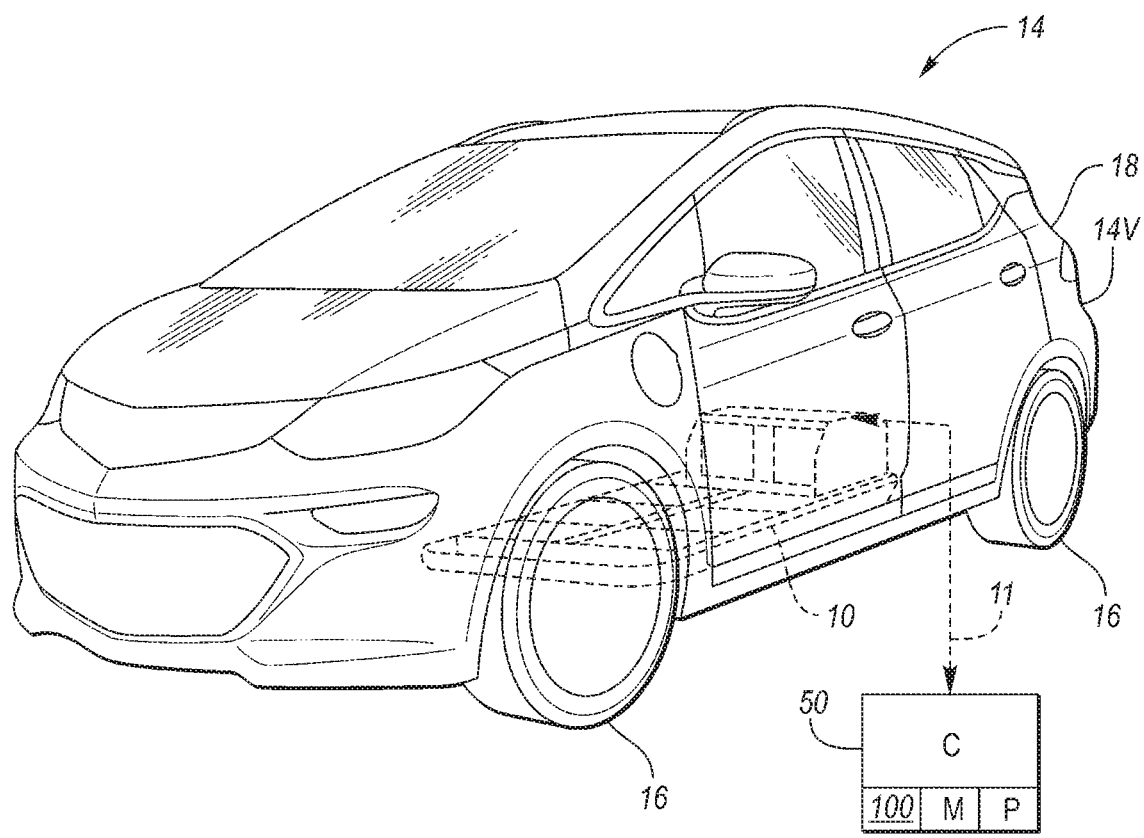
FIG. 1 is a schematic illustration of an example motor vehicle using a multi-cell battery module using an active cell balancing methodology as set forth herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to like components throughout the several views, a battery module 10 and a battery controller (C) 50 are shown in FIG. 1 as part of an electromechanical system 14. The electromechanical system 14 may be embodied as a motor vehicle 14V as shown, or alternatively as a power plant, mobile platform, or robot, a rail or aerospace vehicle, or a marine vessel. In the illustrated motor vehicle 14V, a set of drive wheels 16 may be arranged with respect to a vehicle body 18. Torque from an electric machine (not shown), when such a machine is energized by the battery module 10, may be used to electrically power the drive wheels 16 or another coupled load.

The battery module 10 may be variously configured as a rechargeable lithium-ion or nickel-cadmium battery pack in non-limiting example embodiments. Other embodiments of the battery module 10 may be envisioned having different module shapes and/or power ratings, or that employ active materials other than lithium or nickel-cadmium. The specific configuration and application of the battery module 10 shown in FIG. 1 is therefore intended to help illustrate the present teachings without limitation of such teachings to the specific motor vehicle 14V.

Figure 2:
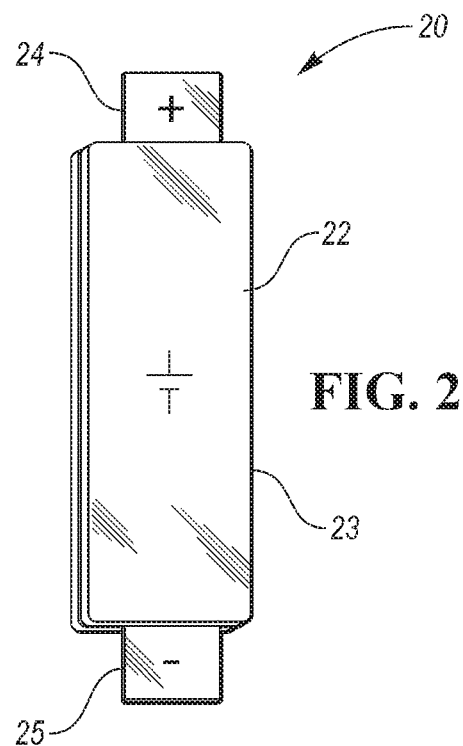
FIG. 2 is a schematic perspective view illustration of a symmetrical battery cell of the battery module shown in FIG. 1.

Referring briefly to FIG. 2, the battery module 10 of FIG. 1 uses a battery cell 20 having a symmetrical configuration. That is, each battery cell 20 used in the construction of the battery module 10 has a foil pouch 22 with edges 21, with the edges 21 extending between elongated sides 23 in the illustrated rectangular configuration. Positive (+) and negative (−) cell tabs 24 and 25, i.e., a cathode tab and an anode tab, respectively, are electrically connected to positive and negative electrode foils (not shown) located within the foil pouch 22. The cell tabs 24 and 25, which protrude a short distance outward from the edges 21, are positioned diametrically opposite from each other as noted above. Although omitted from FIG. 2 for illustrative clarity, the edges 21 may be arranged flush with outer surfaces of the battery module 10 such that the cell tabs 24 and 25 of a given side or end of the battery module 10 are arranged in a single column as shown in FIG. 3.

Although omitted from FIG. 2 for illustrative simplicity, battery modules such as the battery module 10 of FIG. 1 may be constructed using a "repeating frame" configuration in which individual cell frames form a coolant manifold while providing structural rigidity to the battery cells 20. In a possible configuration, a pair of the battery cells 20 of FIG. 2 containing positive and negative electrode foils, a thermal fin defining internal coolant passages, and a foam divider may be sandwiched between adjacent cell frames in a repeating arrangement throughout the battery module 10. Battery coolant may be admitted into the battery module 10 via a coolant port and circulated through or around the battery cells 20 for thermal regulation.

Referring again to FIG. 1, the battery controller 50 may be embodied as a master battery control unit, and may include one or more processors (P) and sufficient amounts of memory (M), e.g., read only memory, random access memory, and electrically-erasable programmable read only memory. The battery controller 50 is configured to execute instructions embodying an active cell balancing method 100, an example of which is described below with reference to FIG. 5. As part of the method 100, the battery controller 50 transmits and receives battery control data (double-headed arrow 11) to and from the battery module 10, including measured or calculated voltages, currents, temperatures, and switch open/closed state control signals as explained in detail below with particular reference to FIGS. 3 and 4.

Figure 3:
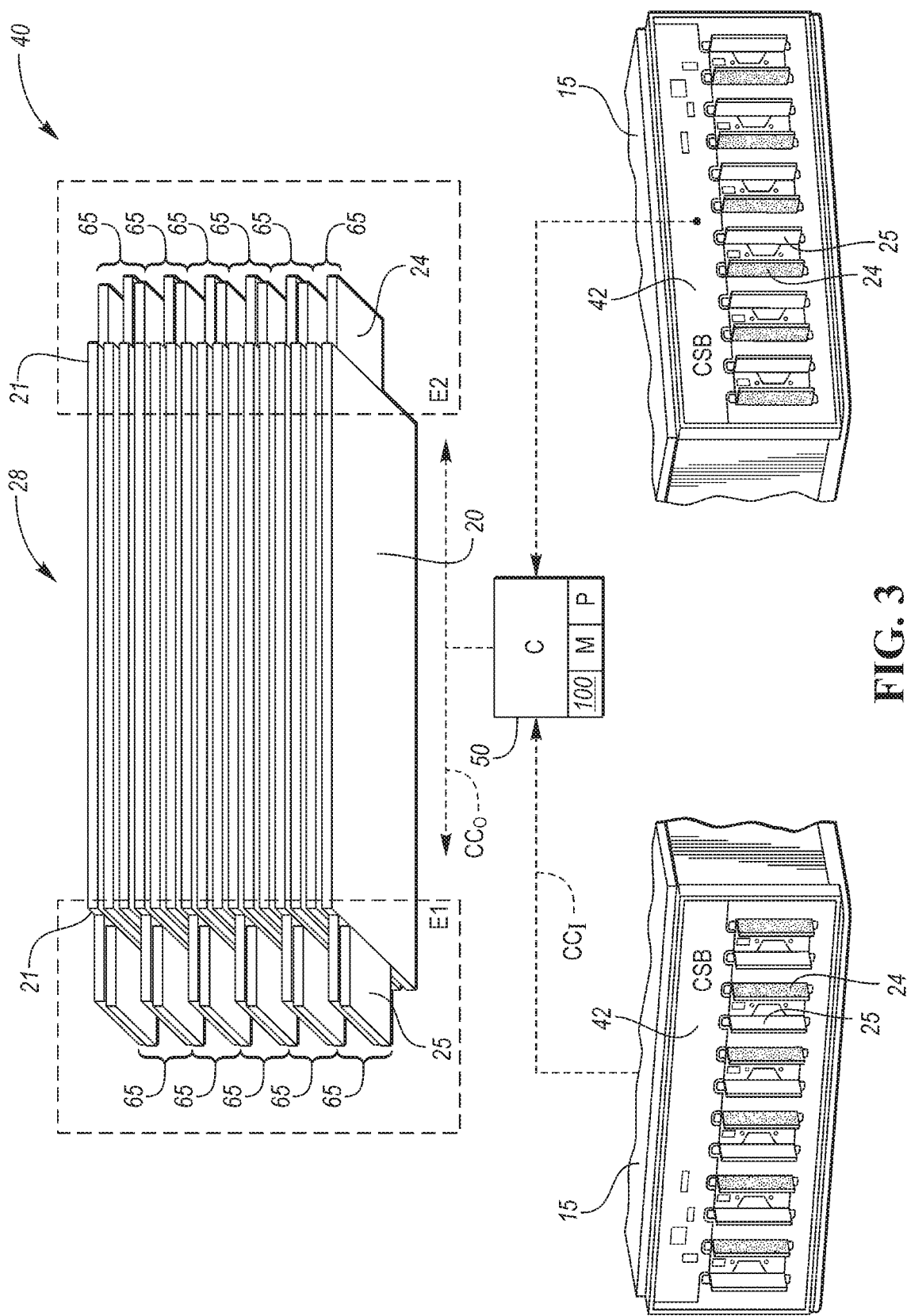
FIG. 3 is a schematic partial exploded view illustration of an embodiment of a battery module depicting symmetrical battery cells and cell sense circuits configured to perform the active cell balancing method described herein.

FIG. 3 schematically depicts a battery system 40 that uses a cell stack 28. The cell stack 28 includes a plurality of the battery cells 20 shown in FIG. 2, such as twelve such battery cells 20 in the illustrated example embodiment. As noted above, the battery cells 20 are symmetrical in their tab configuration. That is, the respective positive and negative cell tabs 24 and 25 of a given battery cell 20 protrude outward from the edges 21 of the foil pouch 22 (see FIG. 2) at opposite ends E1 and E2 of the cell stack 28. The entirety of the cell stack 28 may be enclosed within a battery housing 15, with only a portion of the battery housing 15 shown in FIG. 3 for illustrative simplicity and clarity. Orientation of the battery housing 15 may vary with the intended application, i.e., may be horizontal as shown or vertical. As a result, the term "end" may encompass lateral sides of the battery housing 15, or alternatively a top and bottom of the battery housing.

Figure 4:
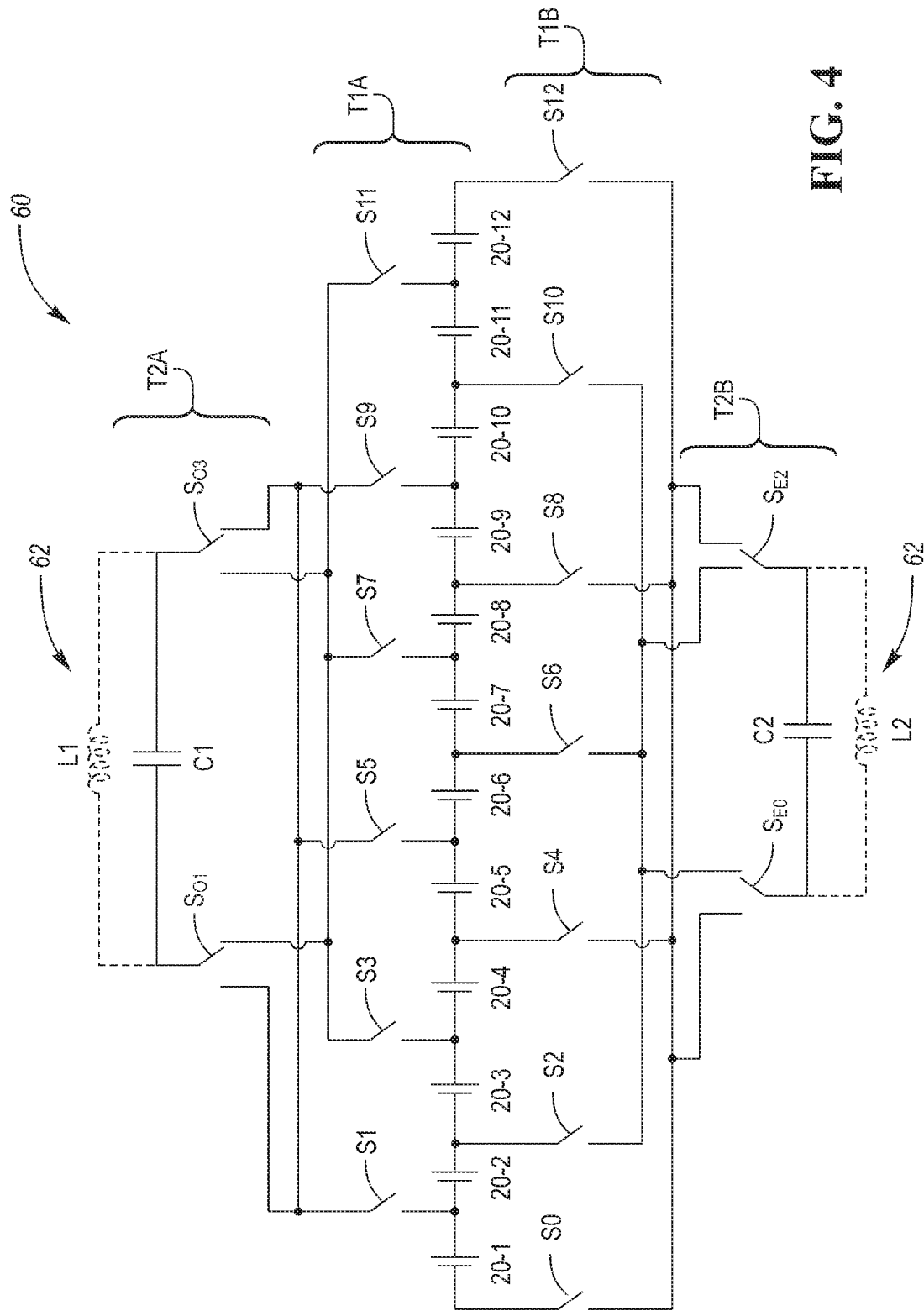
FIG. 4 is a schematic circuit diagram for an active cell balancing circuit usable with the example battery module depicted in FIGS. 1 and 2.

A cell sense board (CSB) 42, i.e., a printed circuit board assembly housing or supporting hardware elements of the disclosed active cell balancing circuit 60 of FIG. 4, may be electrically connected to the positive cell tabs 24 and negative cell tabs 25 at each end E1 and E2. The positive cell tab of cell (1) is connected to the negative cell tab of cell (2) at E1, the positive cell tab of cell (2) is connected to the negative cell tab of cell (3) at E2, and so on. The example cell stack 28 of FIG. 3 includes a total of twelve battery cells 20, and therefore includes a total of twelve positive cell tabs 24, twelve negative cell tabs 25, and two CSBs 42. As a result, six different voltages are measured for the respective cell tabs 24 and 25 plus a block voltage from cell (1) to cell (12) at end E2 and five different voltages are measured for the respective pairs of the twelve cell tabs 24 and 25 plus a block voltage from cell (2) to cell (11) at end E1.

Rather than extending lengths of high-voltage wiring or wiring cables between the cell tabs 24 and 25 of a given battery cell 20, the alternative approach of FIGS. 4 and 5 instead measures intercell voltages, i.e., the electric potential between adjacent pairs of the battery cells 20, doing so at each of the ends E1 and E2. The battery controller 50 thereafter calculates cell voltages for each of the battery cells 20 using the intercell measurements, and thereafter controls a cell balancing operation of the battery module 10 in response to inferred data.

To this end, the CSBs 42 of FIG. 3 are in communication with the battery controller 50, e.g., via transfer conductors or over a wireless connection. The CSBs 42 located at ends E1 and E2 communicate battery control input data (arrow $CC_I$) to the battery controller 50 during ongoing operation of the battery system 40. In turn, the controller 50 performs the method 100 to actively balance a state of charge of the battery cells 20, with the battery controller 50 ultimately outputting binary switching control signals (arrow $CC_O$) to a set of switching hardware, an example of which is depicted in FIG. 4.

FIG. 4 depicts the active cell balancing circuit 60 noted above, with circuit 60 being usable with the battery module 10 of FIG. 1. An embodiment of the method 100 shown in FIG. 5 is usable by the battery controller 50 in the overall control of the active cell balancing circuit 60. Circuit 60 of FIG. 4 shows the ends E1 and E2 of FIG. 3, with some of the battery cells 20 being accessed at each of the ends E1 and E2 as depicted. That is, given the symmetrical configuration of the battery cells 20, the positive and negative cells 24 and 25 of adjacent battery cells 20 are accessible at the ends E1 and E2 as best shown in FIG. 3.

In the illustrated embodiment, energy storage elements 62, such as capacitors C1 and C2 storing electrostatic field energy, may be used at the respective ends E1 and E2 in conjunction with battery cells 20, with twelve example battery cells 20 labeled as 20-1, 20-2, . . . , 20-12. In other embodiments, the energy storage elements 62 may be inductors L1 and L2 that store energy in the form of electromagnetic field energy, and therefore the use of the capacitors C1 and C2 is non-limiting.

For each end E1 and E2, the active cell balancing circuit 60 includes two corresponding tiers of electrical switches, with the switches responsive to a binary switching control signal from battery controller 50. The two tiers include, for the respective ends E1 and E2, first tiers T1A and T1B and second tiers T2A and T2B. The first tiers T1A and T1B may be embodied as single-pole switches, while the switches of the second tiers T2A and T2B may be double-pole switches. Additionally, the switches used in the first tier T1A are oddly-numbered in FIG. 4 as S1, S3, S5, S7, S9, and S11.

The switches of the first tier T1B are evenly-numbered, i.e., S0, S2, S4, S6, S8, S10, and S12, with the numerals 0-12 uniquely identifying the battery cells 20 to which the switches are connected. For instance, switch S1 is connected to a battery cell 20 labeled "20-1" and an adjacent cell labeled "20-2", which switch S0 is an end cell that is also connected to cell 20-1. Similarly, switch S12 is connected to cell 20-12, and as there is no $13^{th}$ battery cell 20 in the illustrated embodiment, cell 20-12 is also a last cell in the cell stack 28.

The second tiers of switches T2A and T2B likewise have oddly and evenly numbered switches, respectively, i.e., $S_{O1}$ and $S_{O3}$ are the designated switches of second tier T2A and $S_{E0}$ and $S_{E2}$ are the designated switches of tier T2B. The physical switches of the first and second tiers T1A, T1B and T2A, T2B may be embodied as contactors or relays, or as semiconductor or solid-state switches in various embodiments. Control of the various switches in the active cell balancing circuit 60 proceeds according to sequential logic blocks of method 100, an example embodiment of which is shown in FIG. 5.

Referring to FIG. 5 and commencing with initialization of the controller 50 at block S101, e.g., upon startup of the example vehicle 14V of FIG. 1, the method 100 proceeds by measuring intercell voltages at block S102. To this end, voltage sensors 65 as shown schematically in FIG. 3 may be disposed between adjacent battery cells 20 and used for this purpose, with the voltage sensors 65 being connected to circuit traces (not shown) of the CSBs 42, and with the CSBs 42 in wired or wireless communication with the battery controller 50 as noted above.

The voltage measurements taken via the voltage sensors 65 represent partial voltage measurements, i.e., the cell voltage of each respective battery cell 20 is not directly measured in the present approach. Instead, the voltage measurements are of voltages V1-V12 of FIG. 3. As shown in FIG. 3, for instance, voltage "V1&V2" is the voltage between the battery cells 20 labeled 20-1 and 20-2 of FIG. 4, "V2&V3" is the voltage between cells 20-2 and 20-3, etc. The battery controller 50 temporarily records such intercell voltages in memory (M). The battery controller 50 may thereafter calculate the corresponding cell voltages for the various battery cells 20 using the intercell voltage data. That is, by measuring the electric potential between adjacent battery cells 20 as opposed to measuring the cell voltages of each of the battery cells 20 directly, one avoids the need for an extended wiring harness between the electrode tabs 24 and 25 of each of the battery cells 20. The method 100 then proceeds to block S104.

Block S104 entails comparing the cell voltages derived at block S102 to calibrated threshold cell voltages. The battery controller 50 determines at block S106 whether an active cell balancing operation is required, i.e., whether some or all of the cell voltages are below or above the calibrated voltage threshold. The method 100 proceeds to block S108 when the battery controller 50 determines that active cell balancing is required. Block S102 is repeated when the battery controller 50 determines that active cell balancing is not required.

Block S107 includes identifying the battery cells 20 having the highest and lowest calculated cell voltages, with the battery controller 50 nominally identifying the battery cell 20 having the highest voltage as the "N" cell and the battery cell 20 having the lowest voltage cell 20 as the "M" cell, with N and M being the numeric identifiers of the battery cells 20, i.e., 1-12 in the example cell stack 28 of FIG. 3 having twelve such battery cells 20. The method 100 then proceeds to block S108.

Block S108 is arrived at when the battery controller 50 determines at block S106 that active cell balancing is required. At block S108, the battery controller 50 determines whether the N and M cells identified at block S107 are adjacent to one another within the cell stack 28 of FIG. 3. The method 100 proceeds to block S120 when the N and M cells are adjacent. The method 100 otherwise proceeds to block S110. At block S110, the battery controller 50 next evaluates the battery cells 20 that are adjacent to the identified N cell from block S10, i.e., the highest voltage battery cell 20, to see if the voltage level ($V_{N-1}$) of one adjacent battery cell 20 is higher than a voltage level ($V_{N+1}$) of another adjacent battery cell 20. That is, if the (N) battery cell 20 is the battery cell 20-5 in FIG. 3, then the (N−1) battery cell 20 is battery cell 20-4 and the (N+1) battery cell 20 is battery cell 20-6. The method 100 proceeds to block S112 when $V_{N-1} > V_{N+1}$. The method 100 proceeds in the alternative to block S113 when $V_{N-1} \leq V_{N+1}$.

Block S112 includes closing the tier 1 switches T1A or T1B corresponding to battery cells (N) and (N−2). The tier 1 switches T1A or T1B in the embodiment of FIG. 4 are labeled S1-S10. The method 100 then proceeds to block S114.

Block S113 includes closing the tier 1 switches T1A or T1B corresponding to the (N−1) and (N+1) battery cells 20, i.e., the battery cells 20 located on either side of the battery cell 20 having the highest cell voltage. The method 100 then proceeds to block S114.

Block S114 includes closing the tier 2 switches T2A or T2B at the same end E1 or E2 as the battery cells 20 that are being actively balanced. Closing of the switches T2A or T2B results in charging of the energy storage elements 62, in this instance the capacitor C1 or C2. The method 100 then proceeds to block S116.

At block S116, the battery controller 50 opens the tier 1 switches connected to the (N) battery cell 20 and then proceeds to block S118.

Block S118 includes closing the tier 1 switches for the (M) and (M−2) battery cells 20, or for the (M−1) and (M+1) battery cells 20, i.e., closing whichever set of switches corresponds to the charged energy storage element 62, and then returns to block S102.

Block S120 is arrived at when a determination is made at block S108 that the (N) and (M) battery cells 20 are adjacent to one another, once again with the (N) cell having the highest cell voltage in the cell stack 28 and the (M) cell having the lowest cell voltage in the cell stack 28. Block S120 includes determining if the (N) or (M) battery cell 20 is the first or last battery cell 20 in the cell stack 28. That is, with the battery cells 20 arranged in an electrical series string as shown in FIG. 4, a battery cell 20 acting as the "last" cell has just one adjacent battery cell 20, i.e., is not sandwiched between two adjacent battery cells 20. In such a situation, there is no (N+1) or (N−1) battery cell 20. The method 100 proceeds to block S110 when neither the (N) battery cell 20 nor the (M) battery cell 20 is the last battery cell 20 in the cell stack 28. The method 100 instead proceeds concurrently to blocks S122 and S123 when the (N) or (M) battery cell 20 is the last battery cell 20 in cell stack 28.

Block S122 includes closing the tier 1 switches for the (N) and (N−2) battery cells 20 via the battery controller 50 before proceeding to block S124.

Block S123 includes closing the tier 1 switches for the (N−1) and (N+1) battery cells 20 and proceeding to block S124.

At block S124, the battery controller 50 closes the tier 2 switches T2A or T2B at the same end E1 or E2 as the battery cells 20 that are being balanced. Closing of switches T2A or T2B charges the energy storage element 62, i.e., capacitor C1 or C2 in the exemplary embodiment of FIG. 4. The method 100 then proceeds to block S126.

At block S126, the battery controller 50 opens the tier 1 switches connected to the (N) battery cell 20, i.e., the battery cell 20 having the highest cell voltage, and then proceeds to block S128.

Block S128 entails closing, via the battery controller 50, the tier 1 switches at the end E1 or E2 corresponding to the charged energy storage element 62, and then returning to block S102.

The approach detailed above therefore uses two tiers of active cell balancing mechanization to enable active cell balancing in a battery module, e.g., the battery module 10 of FIG. 1, having battery cells 20 with a symmetrical battery cell configuration as shown in FIGS. 2 and 3, with the disclosed battery controller 50 using the cell balancing circuit 60 of FIG. 4 to shuttle energy in a controlled manner between designated pairs of such battery cells 20. The present approach eliminates the need for extended wire bundles between cell tabs 24 and 25 of the various battery cells 20 of FIG. 3 when performing battery management functions according to method 100 of FIG. 5. Additionally, the use of the disclosed cell balancing circuit 60 of FIG. 4 may reduce energy losses relative to certain types of passive balancing operations. These and other attendant benefits will be apparent to one of ordinary skill in the art in view of the disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

The invention claimed is:

1. A battery system comprising:
a battery module having a first end, a second end, and a string of battery cells, wherein each respective battery cell of the string has diametrically-opposed positive and negative cell tabs;
an active cell balancing circuit including a plurality of voltage sensors and, at each of the first end and the second end of the battery module: a first tier of switches and a second tier of switches respectively configured as single-pole switches and double-pole switches, and an energy storage element, wherein each respective voltage sensor of the plurality of voltage sensors is respectively located between a different pair of adjacent battery cells of the string; and
a battery controller configured to receive measured voltages from the voltage sensors indicative of an electric potential between each pair of the different pairs of adjacent battery cells; responsive to the measured voltages, to command the first tier of switches at the first end or the second end to selectively connect or disconnect designated pairs of the battery cells to the second tier of switches at a corresponding one of the first end or the second end; and
command the second tier of switches to selectively connect or disconnect the designated pairs of battery cells to a corresponding one of the energy storage elements to thereby shuttle energy between the designated pairs of battery cells and thereby balance a state of charge of the string.

2. The battery system of claim 1, wherein the energy storage element of the first end is a first capacitor and the energy storage element of the second end is a second capacitor.

3. The battery system of claim 1, wherein the energy storage element of the first end is a first inductor and the energy storage element of the second end is a second inductor.

4. The battery system of claim 1, wherein the battery controller is configured to calculate a battery cell voltage for each respective battery cell of the string using the measured voltages, compare the calculated battery cell voltage for each of the battery cells to a calibrated threshold cell voltage, and command the first tier of switches and the second tiers of switches of the first end and the second end to open or close responsive to one or more of the calculated battery cell voltages exceeding the calibrated threshold cell voltage.

5. The battery system of claim 1, wherein the battery controller is configured to command different switches of the first tier of switches and/or the second tier of switches to open or close responsive to one of the battery cells in the string having a highest cell voltage in the string being adjacent to one of the battery cells in the string having a lowest cell voltage in the string.

6. A method for actively balancing a state of charge of a string of battery cells in a battery module having a first end and a second end, each respective battery cell of the string having diametrically-opposed positive and negative cell tabs, the method comprising:
  respectively positioning a cell sense board (CSB) of an active cell balancing circuit at each of the first end and the second end of the battery module, the active cell balancing circuit including energy storage elements and a plurality of voltage sensors, each respective one of the voltage sensors being respectively located between a different pair of adjacent battery cells of the string, the active cell balancing circuit further including a first tier of switches and a second tier of switches located at each of the first end and the second end of the battery module, wherein the switches of the first tier of switches are single-pole switches and the switches of the second tier of switches are double-pole switches;
  receiving measured voltages from the voltage sensors, via a battery controller, wherein the measured voltages are indicative of an electric potential between each of the different pairs of adjacent battery cells;
  responsive to the measured voltages, using the battery controller to command the first tier of switches of the first end or the second end to close or open and thereby respectively connect or disconnect designated pairs of the battery cells to a corresponding one of the second tier of switches; and
  commanding the second tier of switches to selectively connect or disconnect the designated pairs of battery cells to one of the energy storage elements, via the battery controller, such that energy is shuttled between the designated pairs of battery cells and balance a state of charge of the string of battery cells.

7. The method of claim 6, wherein the energy storage elements are capacitors, and wherein closing the second tier of switches charges a corresponding one of the capacitors.

8. The method of claim 6, wherein the energy storage elements are inductors, and wherein closing the second tier of switches charges a corresponding one of the inductors.

9. The method of claim 6, further comprising:
  calculating a battery cell voltage via the battery controller for each respective battery cell of the string using the measured voltages from the voltage sensors;
  comparing the calculated battery cell voltages to a calibrated threshold cell voltage; and
  commanding the first tier of switches and the second tier of switches to open or close responsive to one or more of the calculated battery cell voltages exceeding the calibrated threshold cell voltage.

10. The method of claim 6, further comprising:
  commanding, via different switches of the first tier of switches and/or the second tier of switches to open or close, via the battery controller, responsive to one of the battery cells in the string having a highest cell voltage in the string being adjacent to one of the battery cells in the string having a lowest cell voltage in the string.

11. An active cell balancing circuit for use with a battery module, the battery module having a first end and a second end and a string of battery cells, each respective battery cell of the string of battery cells having diametrically-opposed positive and negative cell tabs, the active cell balancing circuit comprising:
  a first energy storage element and a second energy storage element positioned at the first end and the second end, respectively, wherein the first energy storage element and second energy storage elements are first and second inductors, respectively;
  a plurality of voltage sensors, each respective voltage sensor being respectively located between a different pair of adjacent battery cells of the string;
  a first tier of switches and a second tier of switches located at the first end of the battery module, the first tier of switches of the first end and the second end selectively connecting or disconnecting designated pairs of the battery cells to a corresponding one of the second tier of switches, and the second tier of switches selectively connecting or disconnecting the respective pairs of battery cells, via a corresponding one of the first tier of switches, to one of the first energy storage element or the second energy storage element to shuttle energy between the designated pairs of battery cells and thereby balance a state of charge of the string of battery cells.

12. The active cell balancing circuit of claim 11, wherein the first energy storage element and the second energy storage element respectively include a first capacitor and a second capacitor.

13. The active cell balancing circuit of claim 11, wherein the first energy storage element and the second energy storage element respectively include a first inductor and a second inductor.

* * * * *